US008285616B2

(12) United States Patent
Bahnck, Jr. et al.

(10) Patent No.: US 8,285,616 B2
(45) Date of Patent: Oct. 9, 2012

(54) METHOD AND SYSTEM FOR DYNAMICALLY PRODUCING DETAILED TRADE PAYMENT EXPERIENCE FOR ENHANCING CREDIT EVALUATION

(75) Inventors: Norman Bahnck, Jr., Fogelsville, PA (US); Monica Larue, Allentown, NJ (US); Andrew Blumetti, Allentown, PA (US); Linda Rose, Mountainside, NJ (US); Brian Crigler, Westfield, NJ (US); Sandra Stoker, Allentown, PA (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 224 days.

(21) Appl. No.: 12/748,336

(22) Filed: Mar. 26, 2010

(65) Prior Publication Data

US 2011/0087573 A1    Apr. 14, 2011

Related U.S. Application Data

(60) Provisional application No. 61/211,235, filed on Mar. 27, 2009.

(51) Int. Cl.
G06Q 40/00 (2012.01)
(52) U.S. Cl. .......................................... 705/35
(58) Field of Classification Search .................. 705/35
See application file for complete search history.

(56) References Cited

U.S. PATENT DOCUMENTS

| | | | | |
|---|---|---|---|---|
| 5,704,044 | A * | 12/1997 | Tarter et al. ........................ | 705/4 |
| 6,112,190 | A * | 8/2000 | Fletcher et al. ............. | 705/36 R |
| 7,392,240 | B2 | 6/2008 | Scriffignano et al. | |
| 2003/0061232 | A1 * | 3/2003 | Patterson ................... | 707/104.1 |
| 2003/0117443 | A1 * | 6/2003 | Langner et al. ............... | 345/810 |
| 2003/0229580 | A1 * | 12/2003 | Gass et al. ...................... | 705/38 |
| 2004/0162742 | A1 | 8/2004 | Stoker et al. | |
| 2005/0086155 | A1 * | 4/2005 | Villacorta et al. .............. | 705/38 |
| 2005/0192891 | A1 * | 9/2005 | Ferrera et al. ................... | 705/38 |
| 2005/0240503 | A1 * | 10/2005 | Parker et al. ................... | 705/37 |
| 2007/0112668 | A1 | 5/2007 | Celano et al. .................. | 705/38 |
| 2008/0294547 | A1 * | 11/2008 | Zigman .......................... | 705/38 |
| 2009/0144070 | A1 * | 6/2009 | Psota et al. ........................ | 705/1 |

OTHER PUBLICATIONS

Emel et al: A credit scoring approach for commercial bank sector, 2003, Socio-Economic Planning Sciences, 37 (2003) pp. 103-123.*
Credit Research Foundation: Rule Based Credit Scoring Methodology, 1999, Credit and Management Systems, Inc., pp. 1-12.*
Duns & Bradstreet: Understanding The D&B Financial Stress Score, Sep. 2002, D&B Risk Management Solutions, New Jersey, pp. 1-22.*
International Search Report mailed May 18, 2010 in the corresponding International Application No. PCT/US2010/0112668.

* cited by examiner

*Primary Examiner* — Bijendra K Shrestha
(74) *Attorney, Agent, or Firm* — Ohlandt, Greeley, Ruggiero & Perle, LLP

(57) ABSTRACT

A computer implemented method and system for providing a credit evaluation report, the method comprising: searching a reference file of entities; identifying an entity of interest; determining user specified rules or criteria; selecting at least one relevant trade experience from a database of trade experiences for the entity of interest based upon the user specified rules or criteria, records for comparison to the relevant trade experience, and/or peer groups; and generating the credit evaluation report of the entity of interest based upon the relevant trade experience.

13 Claims, 12 Drawing Sheets

| | Jan-08 | Feb-08 | Mar-08 | Apr-08 | May-08 | Jun-08 | Jul-08 | Aug-08 | Sep-08 | Oct-08 | Nov-08 | Dec-08 | Jan-09 |
|---|---|---|---|---|---|---|---|---|---|---|---|---|---|
| Total Supplier | 5 | 6 | 6 | 7 | 7 | 7 | 6 | 7 | 9 | 7 | 8 | 7 | 8 |
| Total Accounts | 7 | 10 | 9 | 10 | 9 | 10 | 7 | 7 | 9 | 9 | 12 | 10 | 12 |
| Cumulative High Credit | 600,000 | 725,000 | 700,000 | 825,000 | 725,000 | 825,000 | 650,000 | 680,000 | 725,000 | 725,000 | 875,000 | 825,000 | 756,000 |
| Account Level Max High Credit | 150,000 | 150,000 | 150,000 | 125,000 | 100,000 | 125,000 | 140,000 | 125,000 | 100,000 | 100,000 | 90,000 | 90,000 | 90,000 |
| Total Amount Owing | 175,000 | 201,000 | 230,150 | 175,060 | 165,021 | 185,063 | 152,300 | 124,650 | 156,340 | 143,200 | 158,060 | 152,030 | 158,600 |
| Account Level Maximum Amount Owing | 45,983 | 15,021 | 35,060 | 24,603 | 21,002 | 35,630 | 26,044 | 32,050 | 21,600 | 18,605 | 16,540 | 14,563 | 18,540 |
| Total Past Due | 28,000 | 15,021 | 35,060 | 24,603 | 21,002 | 35,630 | 26,044 | 32,050 | 21,600 | 18,605 | 16,540 | 14,563 | 18,540 |
| Account Level Maximum Past Due | 28,000 | 15,021 | 35,060 | 24,603 | 21,002 | 35,630 | 26,044 | 32,050 | 21,600 | 18,605 | 16,540 | 14,563 | 18,540 |
| Future Due | | | | | | | | | | | | | |
| Total Current (Prompt & Discount) | 147,672 | 169,310 | 193,326 | 147,050 | 138,618 | 155,453 | 127,932 | 104,706 | 131,326 | 120,288 | 132,770 | 127,705 | 133,244 |
| Total 1-30 Days | 19,338 | 12,090 | 25,317 | 19,257 | 18,152 | 20,357 | 6,844 | 13,712 | 17,197 | 15,752 | 12,309 | 12,366 | 17,446 |
| Total 31-60 Days | 8,662 | 2,931 | 7,040 | 5,346 | 2,850 | 13,000 | 19,200 | 5,330 | 4,403 | 2,853 | 4,231 | 2,197 | 1,094 |
| Total 61-90 Days | | | 2,704 | | | 2,273 | | 13,009 | | | | | |
| Total 91-120 Days | | | | | | | | | | | | | |
| Total 121-150 Days | | | | | | | | | | | | | |
| Total 151-180 Days | | | | | | | | | | | | | |
| Total > 180 Days | | | | | | | | | | | | | |
| Accounts Current | 4 | 8 | 5 | 6 | 6 | 6 | 4 | 4 | 7 | 6 | 8 | 7 | 9 |
| Accounts 1-30 Days | 2 | 2 | 2 | 3 | 2 | 2 | 2 | 2 | 1 | 1 | 2 | 2 | 2 |
| Accounts 31-60 Days | 1 | | 1 | 1 | 1 | 1 | 1 | 1 | 1 | 1 | 1 | 1 | 1 |
| Accounts 61-90 Days | | | | | | | | | | | | | |
| Accounts 91-120 Days | | | | | | | | | | | | | |
| Accounts 121-150 Days | | | | | | | | | | | | | |
| Accounts 151-180 Days | | | | | | | | | | | | | |
| Accounts > 180 Days | | | | | | | | | | | | | |
| Reported Credits Current | | | | | | | | | | | | | |
| Reported Credits 1-30 Days | | | | (12,060) | | | | | | | | | |
| Reported Credits 31-60 Days | | | | | | | (2,273) | | | | | | |
| Reported Credits 61-90 Days | | | | | | | | | | | | | |
| Reported Credits 91-120 Days | | | | | | | | | | | | | |
| Reported Credits 121-150 Days | | | | | | | | | | | | | |
| Reported Credits 151-180 Days | | | | | | | | | | | | | |
| Reported Credits > 180 Days | | | | | | | | | | | | | |
| Accounts Current | | | | | | | | | | | | | |
| Accounts 1-30 Days | | | | | | | | | | | | | |
| Accounts 31-60 Days | | | | | | | | | | | | | |
| Accounts 61-90 Days | | | | | | | | | | | | | |
| Accounts 91-120 Days | | | | | | | | | | | | | |
| Accounts 121-150 Days | | | | | | | | | | | | | |
| Accounts 151-180 Days | | | | | | | | | | | | | |
| Accounts > 180 Days | | | | | | | | | | | | | |
| Cash Type Accounts | 1 | | 1 | 1 | 1 | 1 | | 1 | 2 | 2 | 1 | 2 | 3 |
| Accounts Placed for Collection | | 1 | | | | | | | 1 | 1 | | | |
| Total Past Due for Collection | | 15,021 | | | | | | | 13009 | 13009 | | | |
| Account Bad Debt/Write offs | | | | | | | | | | | 1 | | |
| Total Amount Owing on Bad Debt Accounts | | | | | | | | 13,009 | | | 13009 | | |

Fig. 3

Example

Trade Payment Experience Data:

| Date Reported | Paying Record | High Credit | Now Owes | Past Due | Selling Terms | Last Sale |
|---|---|---|---|---|---|---|
| 10-08 | Ppt - Slow 90 | 40,000 | 30,000 | 30,000 | Net 30 | 2-3 months |

- Summarizing payment experiences during normal market conditions provides a quick snapshot for decisioning, but we are not currently in "normal market conditions"
- Summarization has its limitations...
  — Captures 12 months of history in a single "payment experience", making it difficult to do sensitivity analyses based on payment dates
  — Masks visibility into payment behavior trends, taking longer for prompt and slow-pay behavior to become evident
- ....And, thereby restricts the visibility you want and need today

*Fig. 5*
*(Prior Art)*

Example:

Detailed Trade Payment Experience Record:

| | Jan-08 | Feb-08 | Mar-08 | Apr-08 | May-08 | Jun-08 | Jul-08 | Aug-08 | Sep-08 | Oct-08 | Nov-08 | Dec-08 | Jan-09 |
|---|---|---|---|---|---|---|---|---|---|---|---|---|---|
| Total Supplier | 5 | 6 | 6 | 6 | 7 | 7 | 6 | 7 | 7 | 7 | 8 | 7 | 8 |
| Total Accounts | 7 | 10 | 9 | 10 | 9 | 10 | 7 | 7 | 9 | 9 | 12 | 10 | 12 |
| Cumulative High Credit | 600,000 | 725,000 | 700,000 | 825,000 | 725,000 | 825,000 | 650,000 | 680,000 | 725,000 | 725,000 | 875,000 | 825,000 | 756,000 |
| Account Level Max High Credit | 150,000 | 150,000 | 150,000 | 125,000 | 100,000 | 125,000 | 140,000 | 125,000 | 100,000 | 100,000 | 90,000 | 90,000 | 90,000 |
| Total Amount Owing | 175,000 | 201,000 | 230,150 | 175,060 | 165,021 | 185,063 | 152,300 | 124,650 | 156,340 | 143,200 | 158,060 | 152,030 | 158,600 |
| Maximum Account Level Amount Owing | 45,983 | 15,021 | 35,060 | 24,603 | 21,002 | 35,630 | 26,044 | 32,050 | 21,600 | 18,605 | 16,540 | 14,563 | 18,540 |
| Total Past Due | 28,000 | 15,021 | 35,060 | 24,603 | 21,002 | 35,630 | 26,044 | 32,050 | 21,600 | 18,605 | 16,540 | 14,563 | 18,540 |
| Maximum Account Level Past Due | 28,000 | 15,021 | 35,060 | 24,603 | 21,002 | 35,630 | 26,044 | 32,050 | 21,600 | 18,605 | 16,540 | 14,563 | 18,540 |
| Total Current | 147,672 | 169,310 | 193,326 | 147,050 | 138,618 | 155,453 | 127,932 | 104,706 | 131,326 | 120,288 | 132,770 | 127,705 | 133,244 |
| Total 1-30 Days | 19,338 | 12,090 | 25,317 | 19,257 | 18,152 | 20,357 | 6,844 | 13,712 | 17,197 | 15,752 | 12,309 | 12,366 | 17,446 |
| Total 31-60 Days | 8,662 | 2,931 | 7,040 | 5,346 | 2,850 | 13,000 | 19,200 | 5,330 | 4,403 | 2,853 | 4,231 | 2,197 | 1,094 |
| Total 61-90 Days | | | 2,704 | | | 2,273 | | 13,009 | | | | | |
| Total 91-120 Days | | | | | | | | | | | | | |
| Total 121-150 Days | | | | | | | | | | | | | |
| Total 151-180 Days | | | | | | | | | | | | | |
| Total > 180 Days | | | | | | | | | | | | | |
| Accounts Current | 4 | 8 | 5 | 6 | 6 | 6 | 4 | 4 | 7 | 6 | 8 | 7 | 9 |
| Accounts 1-30 Days | 2 | 2 | 2 | 3 | 2 | 2 | 2 | 2 | 1 | 1 | 2 | 2 | 2 |
| Accounts 31-60 Days | 1 | | 1 | 1 | 1 | 1 | 1 | 1 | 1 | 1 | 1 | 1 | 1 |
| Accounts 61-90 Days | | | | | | | | | | | | | |
| Accounts 91-120 Days | | | | | | | | | | | | | |
| Accounts 121-150 Days | | | | | | | | | | | | | |
| Accounts 151-180 Days | | | | | | | | | | | | | |
| Accounts > 180 Days | | | | | | 1 | | 1 | | | | | |
| Cash Type Accounts | 1 | | 1 | | 1 | | | | 2 | 2 | 1 | 2 | 3 |
| Accounts Placed for Collection | | | | | | | | | 1 | 1 | | | |
| Total Past Due for Collection | | 15,021 | | | | | | | 13009 | 13009 | | | |
| Account Bad Debt/Write offs | | | | | | | | | | | 1 | | |
| Total Amount Owing on Bad Debt Accounts | | | | | | | | 13,009 | | | 13009 | | |

Fig. 7

METHOD AND SYSTEM FOR DYNAMICALLY PRODUCING DETAILED TRADE PAYMENT EXPERIENCE FOR ENHANCING CREDIT EVALUATION

CROSS-REFERENCED APPLICATIONS

This application claims priority to U.S. Provisional Application No. 61/211,235, filed on Mar. 27, 2009, which is incorporated herein in its entirety.

BACKGROUND

1. Field of the Disclosure

The present disclosure relates to an evaluation of data relating to a credit worthiness of an entity, and, more particularly, to producing data that provides detailed trade payment experience about the entity which is classified, stored and meta-data tagged, as well as combined with event-drive enhancements of relevancy statistics, and thereafter put through a novel customer specific evaluation process.

2. Description of the Related Art

An entity is a legal entity (e.g., an individual, a partnership or a company) that conducts business or purports to conduct business. A trade experience is a record of a transaction between a supplier and a purchaser including, but not limited to, terms of sales, credit allowance, age of open balances, payment details and account information concerning an experience of an entity, involving the entity's payment for a good or service provided to the entity.

Traditionally, a payment index (PAYDEX™) score, which is a credit information service that rates payment performance, was calculated for all trade experiences. The score was a weighted average of how fast or slow a company paid others. The company may have a good score, yet pay some parties on time and others late. For example, a company may pay parties with big relationships one way and those with small relationships another way.

Customer feedback indicated that they wanted more data used in the calculation; they wanted the data to be fresher, and they wanted the data to be more relevant to them in particular. The customer experience was that some customers behaved just like the score and others did not and they did not know why. Customers indicated that certain types of trade experience and history had higher importance than other trades. There is a need for a payment performance score segmented by industry, size of the business, age of the business and payment ranges that is more predictive of how a company will pay a particular party.

One such credit report which depicts trade experiences is disclosed in U.S. Patent Publication No. 2005/0240503, which is incorporated herein in its entirety, and wherein a payment performance score is calculated for particular industries, payment ranges, and time sensitivity periods, such as 3, 6, 9, and 12 month calculations. The score is predictive of how a company will pay a particular party. The score is based on trade experiences and is provided in a report.

FIGS. 4 and 5 depict a conventional detail trade process with invoice level detail 300, supplier provided account level trade detail 302 and summary elements 304 (e.g., date of experience, payment record, high credit, now owes, past due, selling terms and date of last sale). FIG. 5 shows a conventional trade payment experience report which summarizes payment experiences during normal market conditions so as to provide a quick snapshot for decisioning under normal market conditions. This summarization has its limitations, i.e., (a) it only captures 12 months of history in a single "payment experience", making it difficult to do sensitivity analyses based on payment dates, and (b) it masks visibility into payment behavior trends, taking longer for prompt and slow-pay behavior to become evident. The disadvantage of the prior art detail trade reporting is that it restricts the visibility the customers want and need in volatile market conditions.

However, none of the current credit reports provide enough current and relevant trade experiences to enable companies to make informed creditworthiness decisions, especially in today's rapidly changing economic environment. The present disclosure provides for the generation of credit reports that are much more current and accurate regarding a company's creditworthiness, thereby avoiding the use of obsolete data in making such decisions. In addition, the present disclosure provides the ability for unique trade data aggregation, synthesis and relevancy processing of data, and application of customer specific evaluation processing.

SUMMARY

There is a need for a credit report that provides detailed trade payment experiences concerning recent conduct of an entity, for example, conduct during a month immediately preceding the report. There is also a need for such a credit report that takes into account recent economic trends that may affect a credit decision, by providing trade details pertaining to monthly or weekly changes so as to provide customers with a more accurate report upon which they can judge a company's creditworthiness.

The above-noted needs are fulfilled by a computer implemented method that includes (a) receiving first data concerning a first trade experience of an entity, (b) processing the first data to produce a first credit evaluation concerning the entity, and enrichment of the data with demographics for segmentation wherein the processing yields intermediate data, (c) storing the intermediate data in a database, (d) receiving second data concerning a second trade experience of the entity, (e) matching the second data to intermediate data in the database, (f) retrieving the intermediate data from the database, (g) processing the second data and the intermediate data to produce a second credit evaluation concerning the entity, and (h) generating a credit report which comprises the second credit evaluation. There is also provided a system that performs the method.

The present disclosure allows for users to define their own PAYDEX™ or prioritized criteria for evaluation on a month to month basis and delivery thereof. In addition, the method and system of the present disclosure can send formatted or customized alerts should a material change occur in the trade experience data. This new trade experience data can be used to deliver more accurate and current industry and performance reports to the user.

A computer implemented method for providing a credit evaluation report is disclosed. The method comprising: searching a reference file of entities; identifying an entity of interest; determining user specified rules or criteria; selecting at least one relevant trade experience from a database of trade experiences for the entity of interest based upon the user specified rules or criteria, records for comparison to the relevant trade experience, and/or peer groups; and generating the credit evaluation report of the entity of interest based upon the relevant trade experience.

Prior to generating the credit evaluation report, the method can further assess the performance across the relevant trade experience for the entity of interest. Preferably, the reference file is at least data selected from the group consisting of: entity name, entity address, entity telephone number, and contact at the entity.

Preferably, the database of trade experiences is created by: collecting of data from at least one trade source; matching the entities; and linking the entities to related entities, thereby enabling corporate family tree risk analysis, thereby producing the trade experiences.

The method further comprises classifying the trade experiences. The trade experience is classified by applying a metadata tag to each the trade experience.

The method further comprises at least one event-driven enhancement selected from the group consisting of: creating segmentation benchmark statistics, identifying trade experience behaviors consistent with fraudulent companies, and detecting changes in trade experience that is indicative of the entity of interest's business either improving or deteriorating.

The classification step optionally comprises creating an archetypical reference data of the trade experiences, performing benchmarking of the trade experiences, and/or performing external relevant benchmarking and data correlation of the trade experiences.

The event-driven enhancement step comprises: performing benchmarking of the trade experiences, and/or performing external relevant benchmarking and data correlation of the trade experiences.

Also disclosed is a computer system comprising: a processor; a database; and a memory that contains instructions that are executable by the processor to control the processor to perform actions of: searching a reference file of entities; identifying an entity of interest; determining user specified rules or criteria; selecting at least one relevant trade experience from a database of trade experiences for the entity of interest based upon the user specified rules or criteria, records for comparison to the relevant trade experience, and/or peer groups; and generating a credit evaluation report of the entity of interest based upon the relevant trade experience.

Also disclosed is a storage medium comprising instructions tangibly embodied thereon, wherein the instructions are readable by a processor to cause the processor to perform actions of: searching a reference file of entities; identifying an entity of interest; determining user specified rules or criteria; selecting at least one relevant trade experience from a database of trade experiences for the entity of interest based upon the user specified rules or criteria, records for comparison to the relevant trade experience, and/or peer groups; and generating a credit evaluation report of the entity of interest based upon the relevant trade experience.

BRIEF DESCRIPTION OF THE DRAWINGS

FIG. 3 is an example of a credit report produced by the system of FIG. 1.

FIG. 5 is a report generated from a conventional detail trade program.

FIG. 7 is a report generated from the detail trade program of the present disclosure.

DESCRIPTION OF THE PREFERRED EMBODIMENT

The system described herein leverages payment detail about an entity to increase accuracy and relevance of data, predictive models, scores and risk management solutions by combining detailed trade information, transformed detailed trade information, and value-added attributes based off trade aging information.

The system provides enhanced and timely detailed trade payment information. The system will meaningfully adapt to today's market conditions by providing insight into select sets of trade activity (i.e. the most recent behavior in a specific industry) to enhance understanding of risk. For example, instead of merely depicting 12-36 months of trade experience, the system provides a more granular approach of detecting changes and providing insightful trending insights based on month-to-month behavior. That is, the present disclosure provides granular trade details on greater than 1 billion commercial trade experiences comprising the most comprehensive payment experience and open balance data available on the market. This data is used by business entities and individuals to quickly identify and act upon credit risks with respect to origination, portfolio management and collections. In addition, the detailed trade payment data generated by the system and method of the present disclosure from over 260 million supplier/purchaser relationships enables credit professionals to quickly identify and confidently act upon risks in volatile economic environments.

This data enables confident credit decisions by fully utilizing the most timely, precise and granular data available which provides for unprecedented visibility into monthly trade experiences, as well as increased time sensitivity to spot changes in company payment trends from discrete data of experience detail.

Figure 1:
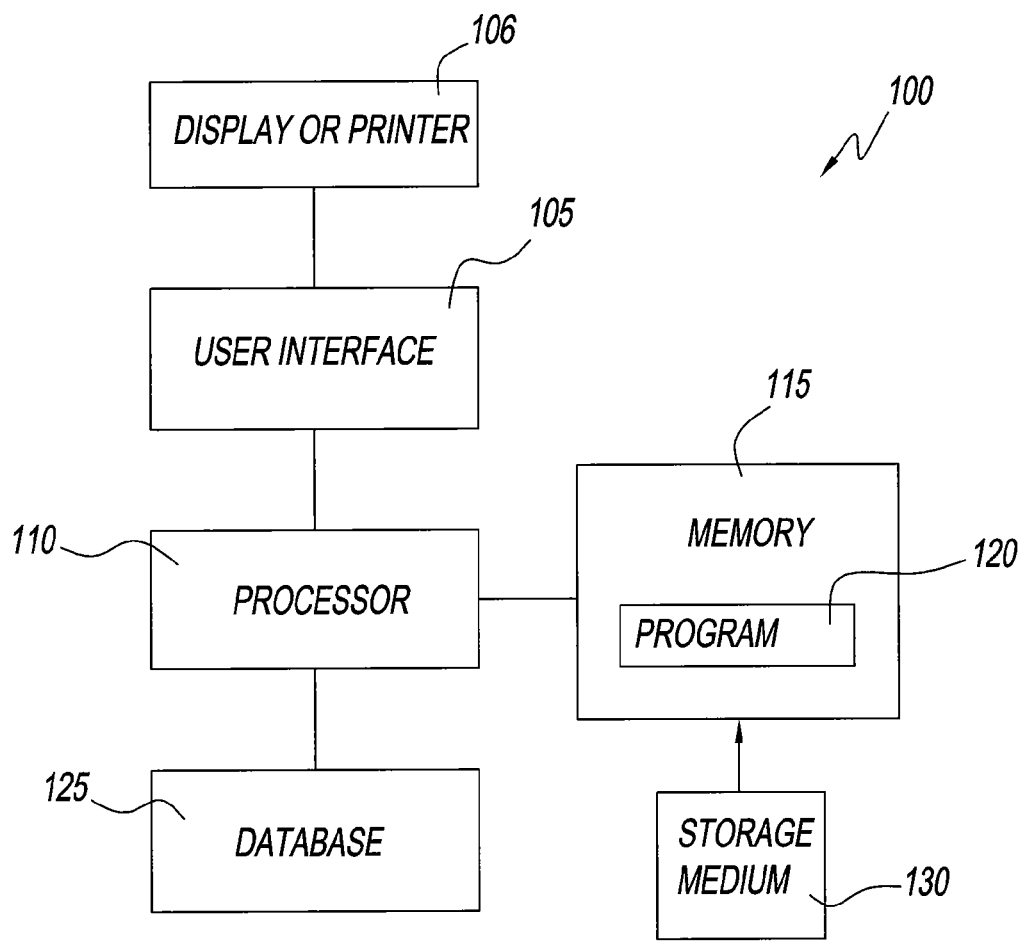
FIG. 1 is a block diagram of a computer system for implementation of the present disclosure.

FIG. 1 is a block diagram of a computer system 100 for employment of the present invention. System 100 includes a user interface 105, a processor 110, a memory 115 and a database 125. System 100 may be implemented on a general-purpose computer. Although system 100 is represented herein as a standalone system, it is not limited to such, but instead can be coupled to other computer systems (not shown) via a network (not shown).

Memory 115 stores data and instructions for controlling the operation of processor 110. An implementation of memory 115 would include a random access memory (RAM), a hard drive and a read only memory (ROM). One of the components of memory 115 is a program 120.

Program 120 includes instructions for controlling processor 110 to execute methods described herein. For example, program 120 is a collection of instructions that are executable by processor 110 to control processor 110 to perform actions of (a) receiving first data concerning a first trade experienced of an entity, (b) processing the first data to produce a first credit evaluation concerning the entity, wherein the processing yields intermediate data, (c) storing the intermediate data in a database, (d) receiving second data concerning a second trade experience of the entity, (e) matching the second data to intermediate data in the database, (f) retrieving the intermediate data from the database, (g) processing the second data and the intermediate data to produce a second credit evaluation concerning the entity, and (h) generating a credit report which comprises said second credit evaluation. Preferably, the credit report is output via user interface 105 to a display or printer 106.

Program 120 may be implemented as a single module or as a plurality of modules that operate in cooperation with one another. The term "module" is used herein to denote a functional operation that may be embodied either as a stand-alone component or as an integrated configuration of a plurality of sub-ordinate components.

User interface 105 includes an input device, such as a keyboard or speech recognition subsystem, for enabling a user to communicate information and command selections to processor 110. User interface 105 also includes an output device such as a display or a printer 106. A cursor control such as a mouse, trackball, or joy stick, allows the user to manipulate a cursor on the display for communicating additional information and command selections to processor 110.

While program 120 is indicated as already loaded into memory 115, it may be configured on a storage medium 130 for subsequent loading into memory 115. Storage medium 130 can be any conventional storage medium that stores program 120 thereon in a tangible form. Examples of storage medium 130 include a magnetic tape, an optical storage media, a compact disk, or a floppy disk. Alternatively, storage medium 130 can be a random access memory, or other type of electronic storage, located on a remote storage system.

The ability to generate a report that provides month-to-month behavior is enabled, in part, by the manner in which program 120 processes and stores data in database 125. As data is processed, intermediate results are retained and stored so that they can be utilized in a subsequent process. Database 125 is thus a multi-dimensional database.

Steps associated with these processes can be performed in any order, unless otherwise specified or dictated by the steps themselves.

Moreover, although program 120 is described herein as being installed in memory 115, and therefore being implemented in software, it could be implemented in any of hardware, firmware, software, or a combination thereof.

Figure 2:
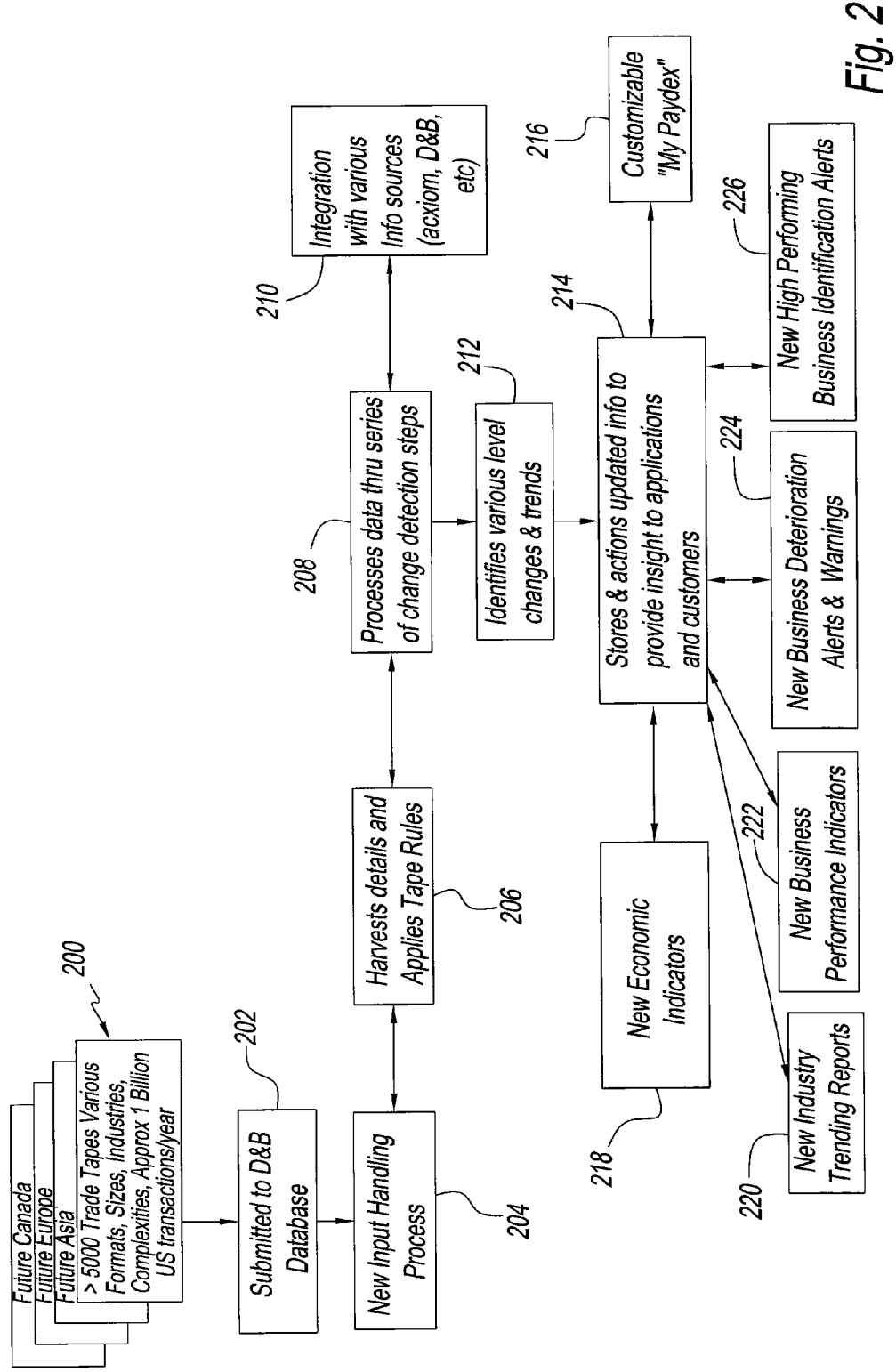
FIG. 2 is a flowchart of a method employed by the system of FIG. 1, for processing trade data inputs to produce a credit report.
Figure 4:
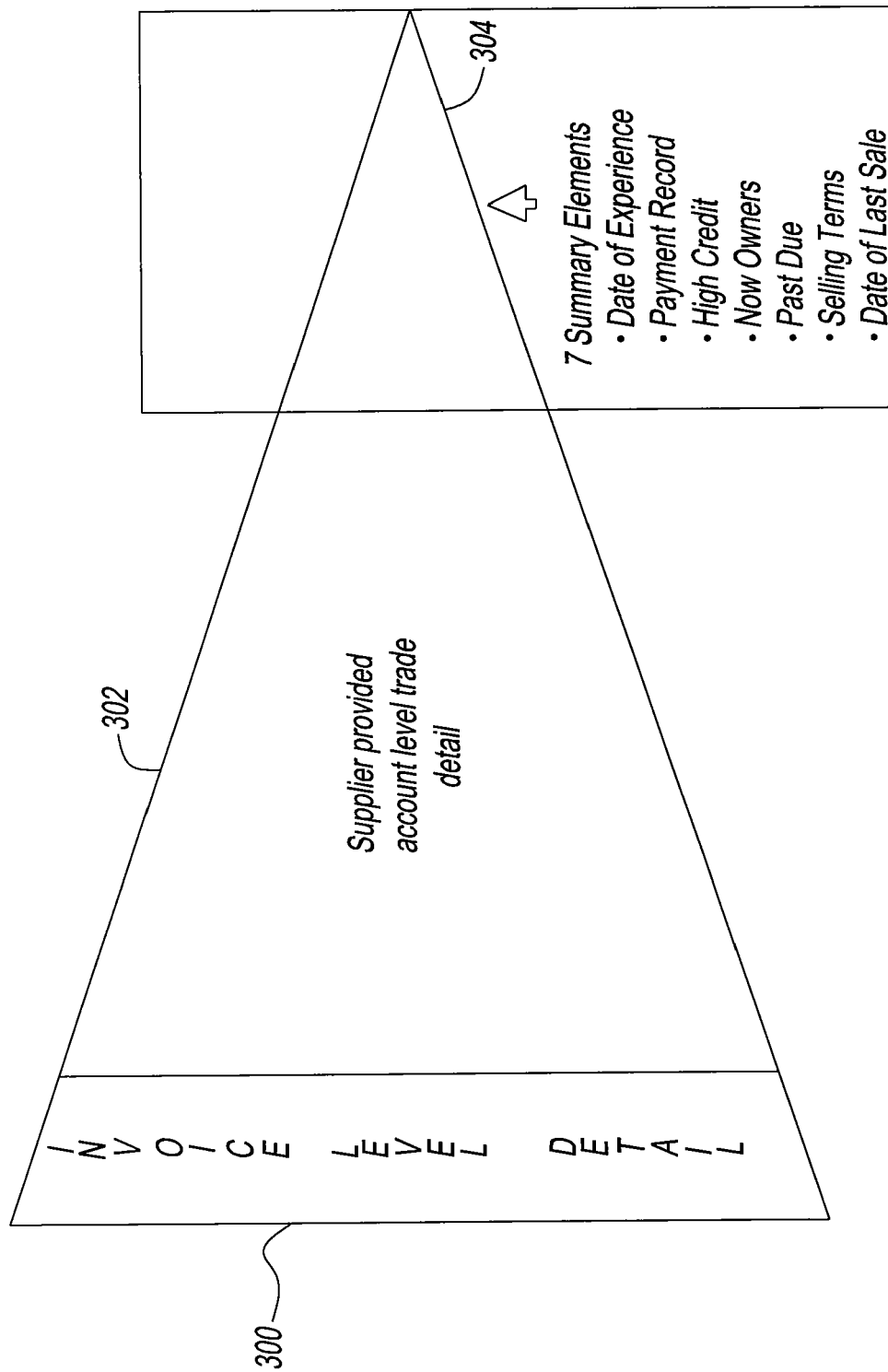
FIG. 4 is graphical representation of a conventional detail trade program.

FIG. 2 is a flowchart of a method employed by system 100, for processing data to produce a credit report, wherein detail trade tapes 200 of various formats, sizes, and industries complexities are downloaded into a database 202. Thereafter, the detail trade information is processed through data handler 204 and then details are harvested therefrom and tape rules are applied 206. Once the tape rules are applied, the detail data is processed through a series of change detection steps 208, which is integrated with various information sources 210, e.g., Acxiom, Dun & Bradstreet, etc.). Thereafter, the system of the present disclosure identifies various level changes and trends in the retrieved detail trade data 212 and then stores and actions updated information to provide insight to applications and customers 214. The stored detail trade data from step 214, then can be used to customize a Paydex report 216, or produce new economic indicators 218, new industry trending reports 220, new business performance indicators 222, new business deterioration alerts and warnings, 224, and new high performing business identification alerts 226.

FIG. 3 is an example of a credit report produced by system 100.

Figure 6:
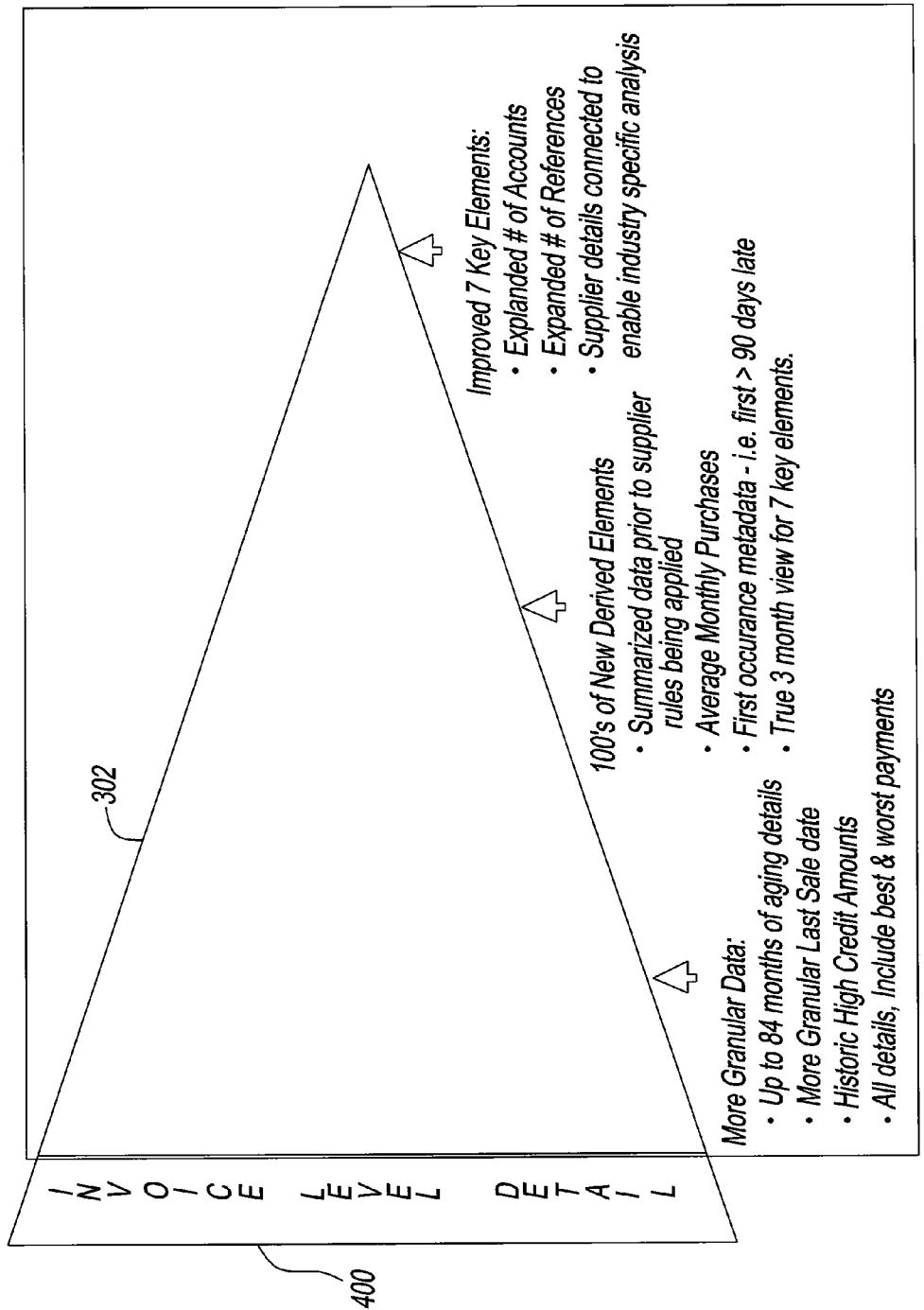
FIG. 6 is a graphical representation of a detail trade program according to the present disclosure.

FIG. 6 is a graphical representation of a detail trade program according to the present disclosure, wherein invoice level detail 400 is combined with more granular data than conventional system (e.g., up to 84 months of aging details, more granular last sale date data, historic high credit amounts, and all details, including, but not limited to, best and worst payments). Thereafter, the system 100 includes new derived elements, e.g., summarized data prior to supplier rules being applied, average monthly purchases, first occurrence metadata (i.e., first greater than 90 days late) and/or true 3 month view for key elements (e.g., date of experience, payment record, high credit, now owes, past due, selling terms and date of last sale). In addition, the key elements have been expanded to include: expanded number of accounts, expanded number of references, and supplier details connected to enable industry specific analysis.

FIG. 7 is a detailed trade payment experience record created using the novel detail trade program of FIG. 6 above. This information refines attributes used in decisioning scorecards based upon detailed trade results to maximize accept/reject and portfolio performance. In addition, it allow sellers to identify and refine risk shift movements within a portfolio at a customer or cluster (e.g., SICs, geo) level earlier by using 30, 60, or 90 detailed trade within behavioral models. Also, sellers can review credit lines for increases/decreases based upon detailed trade risk shifts (once masked by conventional detail trade programs). Sellers can also refine bad debt reserves in a more timely and effective manner based upon risk changes/shifts in the portfolio. Finally, the new detail trade system of the present disclosure can assist in driving differentiated collection strategies and account prioritization from the detailed trade specifics/flags (e.g., take quicker, more aggressive action on accounts that carry external risk as well).

As an example of the extreme differences between a conventional detail trade process and the portfolio management detail trade process of the present, consider both Companies A and B having a customer for 20 years with some prior delinquencies and other accounts with some delinquency in the past. Under the conventional detail trade process, these two companies look identical, appear to have the same credit risk and would typically be treated the same. However, under the detail trade process of the present disclosure which applies a much more granular view of the credit worthiness of each company the following was shown.

Under the process and system of the present disclosure, it was determined that Company A had multiple accounts at 60 days past due with significant dollars, the number and value of accounts rolling from 30 to 60 days increases notably this month, and unprecedented levels of delinquency for previously well maintained accounts. Thus, it can be determined that whereas under the conventional detail trade process Company A appeared to be a good credit risk, the more granular analysis afforded under the detail trade process of the present disclosure clearly demonstrated that Company A had an increased risk of not paying its invoices on time and that a review of the credit policy for this company may be justified to limit exposure and potential losses.

An analysis of the creditworthiness of Company B under the detail trade process of the present disclosure demonstrated that it had fewer accounts at 60 days past due, possibly at low dollars or representing disputes, no substantial degradation over the past month, and delinquency levels were in line with historical performance. Thus, it can be determined with a much higher degree certainty that Company B is paying its suppliers in a way that is consistent with previously established patterns, and there is little evidence in their payment behavior to suggest otherwise. Accordingly, Company B represents a much more limited risk exposure than Company A and does not justify any additional credit policy review.

Figure 8:
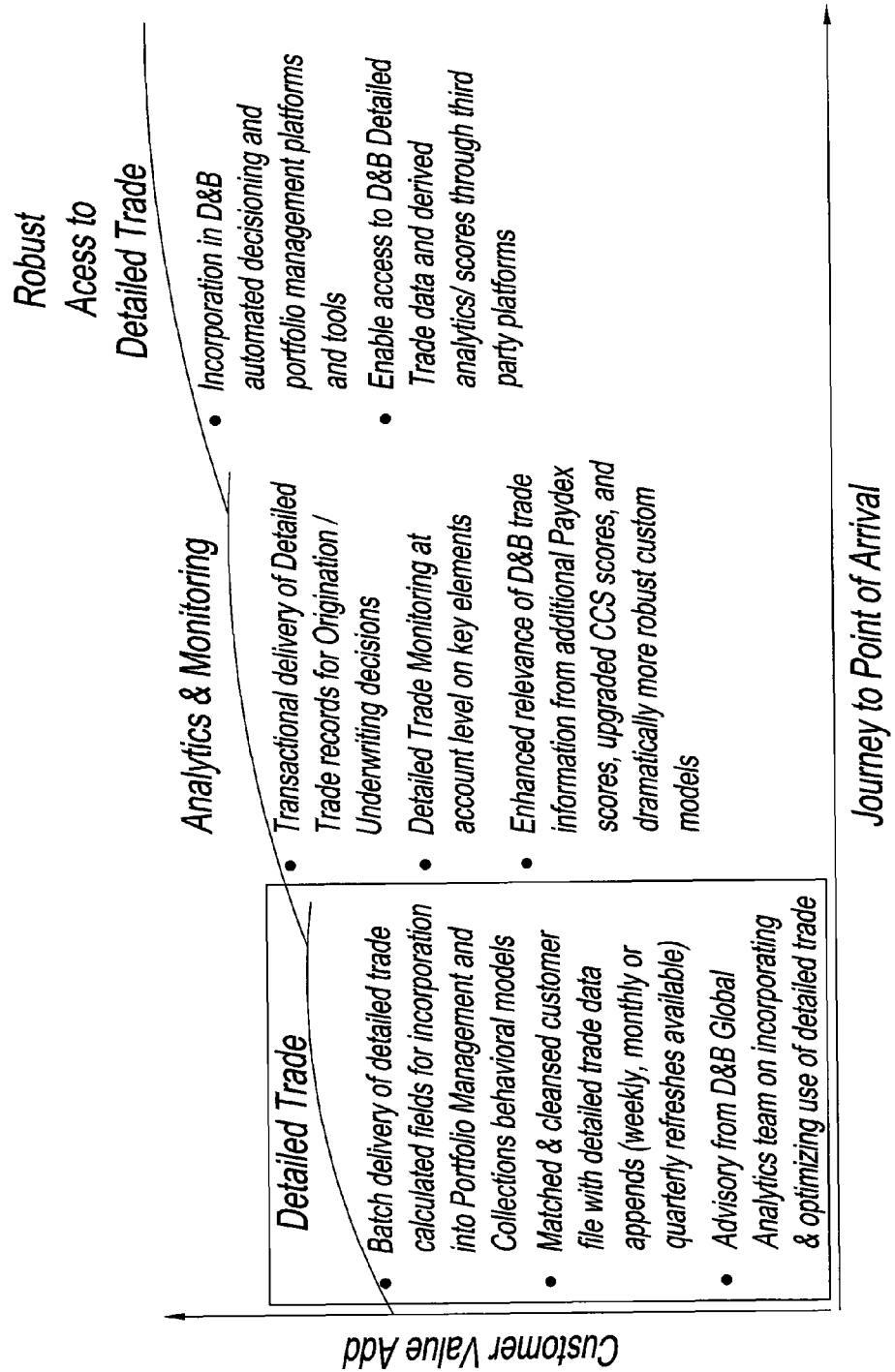
FIG. 8 is a chart plotting customer value add vs. journey to point of arrival.

FIG. 8 is a chart demonstrating the additional steps that enhance the detail trade information generated pursuant to the process of the present disclosures. The initial steps of detail trade analysis involve (1) batch delivery of detailed trade calculated fields for incorporation into a portfolio management and collection behavioral model, and (2) match and cleanse customer file with detailed trade data appends (i.e., weekly, monthly or quarterly refreshes available). Additional analytics and monitoring steps are added, such as, (1) transactional delivery of detailed trade records for origination/underwriting decisions, (2) detailed trade monitoring at account level on key elements, and (3) enhanced relevance of trade information from additional Paydex scores, upgraded CCS scores, and dramatically more robust custom models. This will allow robust access to detailed trade, e.g., incorporation into automated decisioning and portfolio management platforms and tools, and enable access to detailed trade data and derived analytics/scores through third party platforms.

Figure 9:
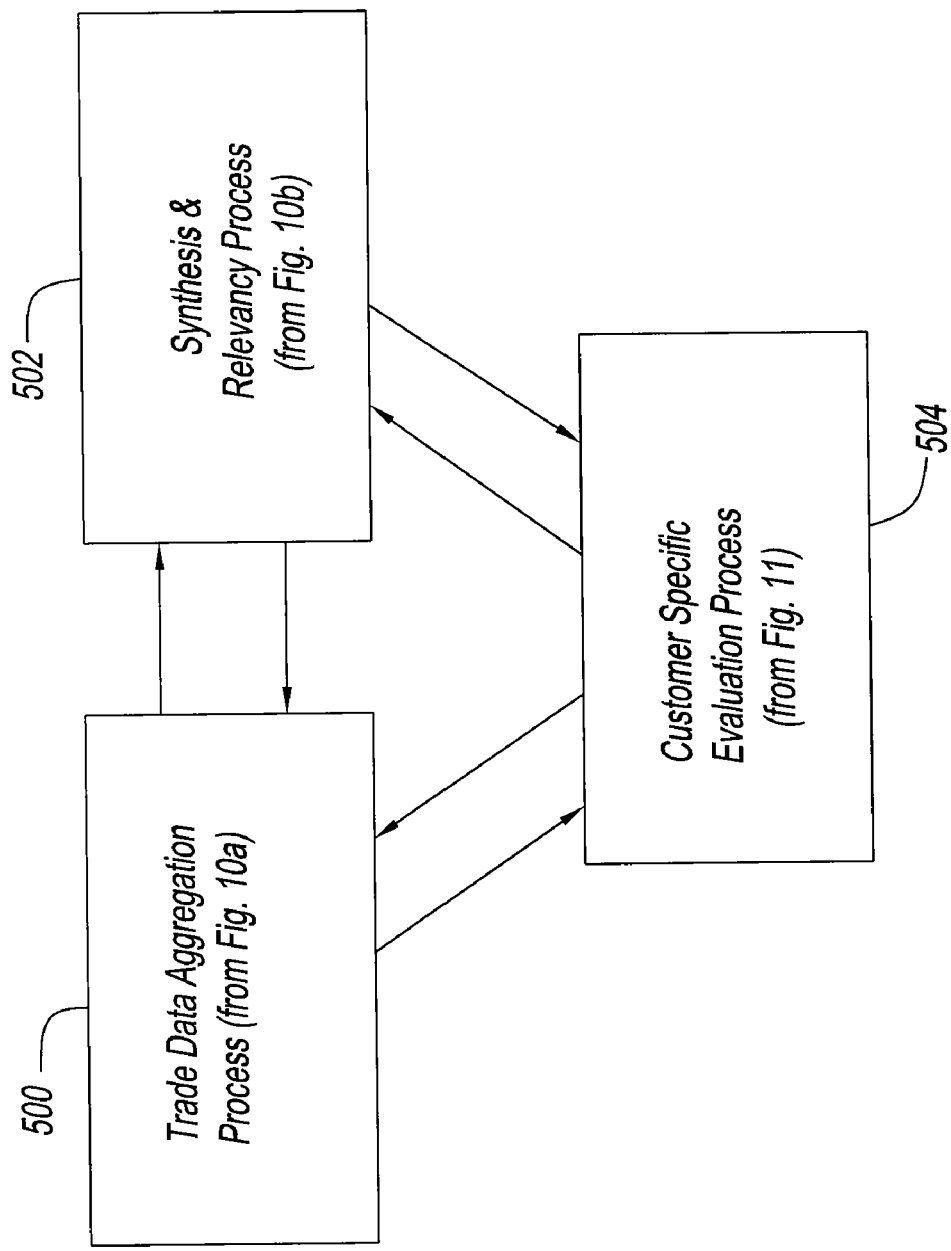
FIG. 9 is a high level overview of the novel detail trade process according to the present disclosure, i.e., trade data aggregation process, synthesis and relevancy process and customer specific evaluation process.

FIG. 9 generally describes the new method and system for dynamically producing detailed trade payment experience for enhanced credit evaluation and incorporates several novel processes. The trade data aggregation process 500 leverages input from over 8,000 global trade sources, with DUNSRight® proprietary data enrichment processes (see US Patent Publication No. 2004/0162742, which is incorporated herein by reference in its entirety) to create new value-added insights for users. This trade data is synthesized via a synthesis and relevancy process 502 through a series of new processes and is classified with meta-data tags to enable dynamic relevancy assignment to ensure the most predictive and relevant trade insight is used for each user's credit evaluation. The data aggregation process 500 will also establish data sets to ensure the most relevant trade experience is used in each circumstance. These data sets will be organized across several segments (e.g., industry, geography, age of business entity, size of entity, etc.) and leveraged for benchmarking statistics, peer group analytics, performance and behavioral analysis. Where appropriate, external data sources(e.g., unemployment, new business construction etc.) will be incorporated to augment the trade experience to add valuable insights.

When a user or customer chooses to use this new capability, they may establish their prioritized criteria(s) for evaluation 504 so the fulfillment process will be customized to incorporate only the most relevant trade insight. Standard profiles will be established for users who have not customized their criteria. These standard profiles will be continuously updated based on the ongoing trade experience collected through this new process.

Figure 10A:
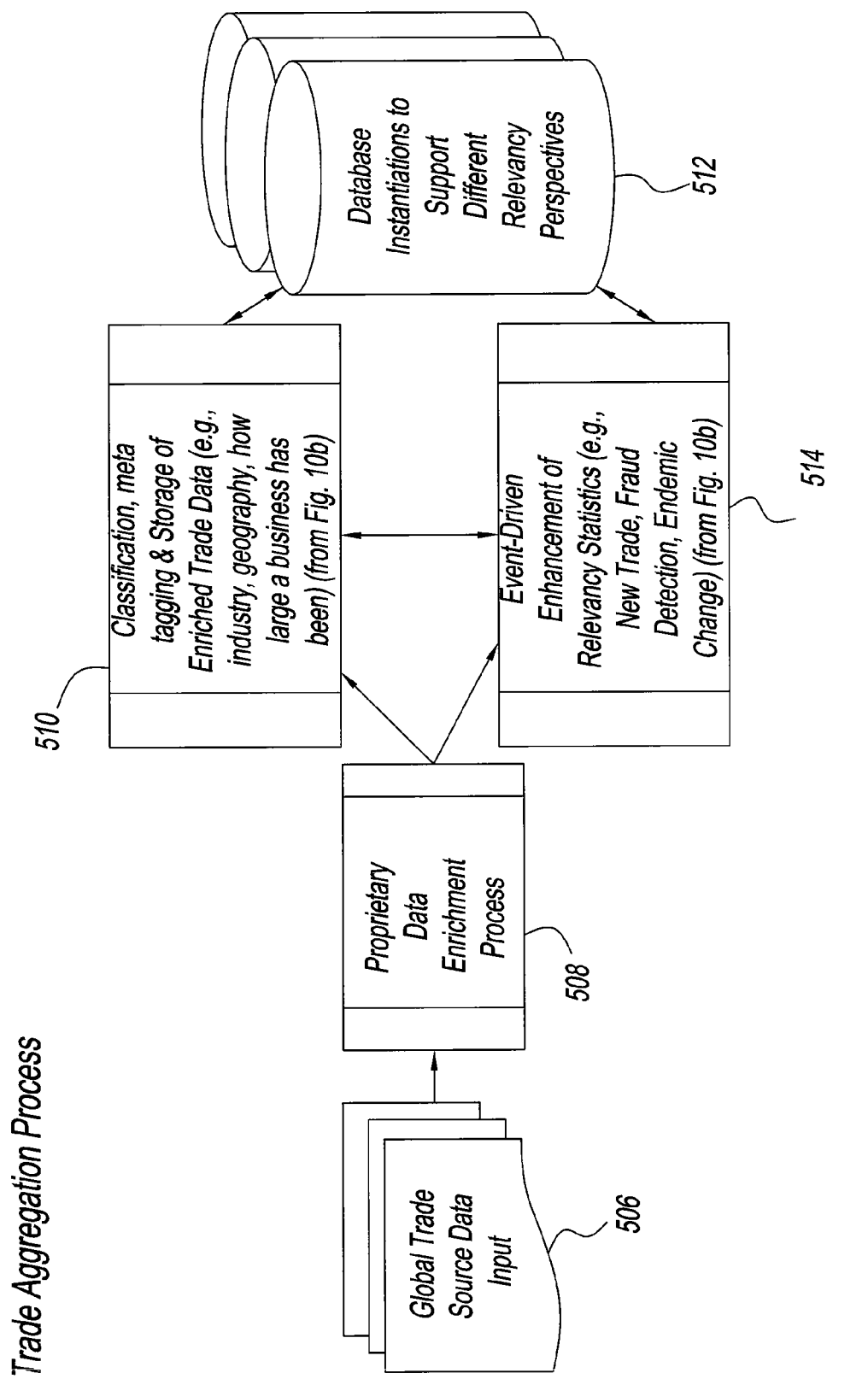
FIG. 10*a* is a block diagram of the trade aggregation process according to the present disclosure.

FIG. 10a demonstrates the trade aggregation process 500 of FIG. 9 which begins with the process depicted in FIG. 2 to support collection of trade input from global trade sources 506. These trade experiences will be enhanced through the DUNSRight Process by matching the business entities, linking reported business entities to their global ultimate business entity to enable full global family tree risk analysis, and to append data for segmentation purposes, i.e., proprietary data enrichment process 508. The system will classify reported trade experiences by various meta-data tags to enable rapid comparative analysis by relevant groups to assess a business entity's trade performance for credit evaluations 510. In this part of the process, the system will also leverage existing history (up to 84 months) of the business entity's prior trade experience to develop trending analytics to detect specific changes in trade behaviors. These new trade performance attributes will be stored in a database 512 designed to support multiple perspectives for dynamic retrieval for analytics. This same trade experience data will be used to create segmentation benchmark statistics, identify trade experience behaviors consistent with fraudulent companies and detect changes that could be indicative of business improvement/deterioration 514.

Figure 10B:
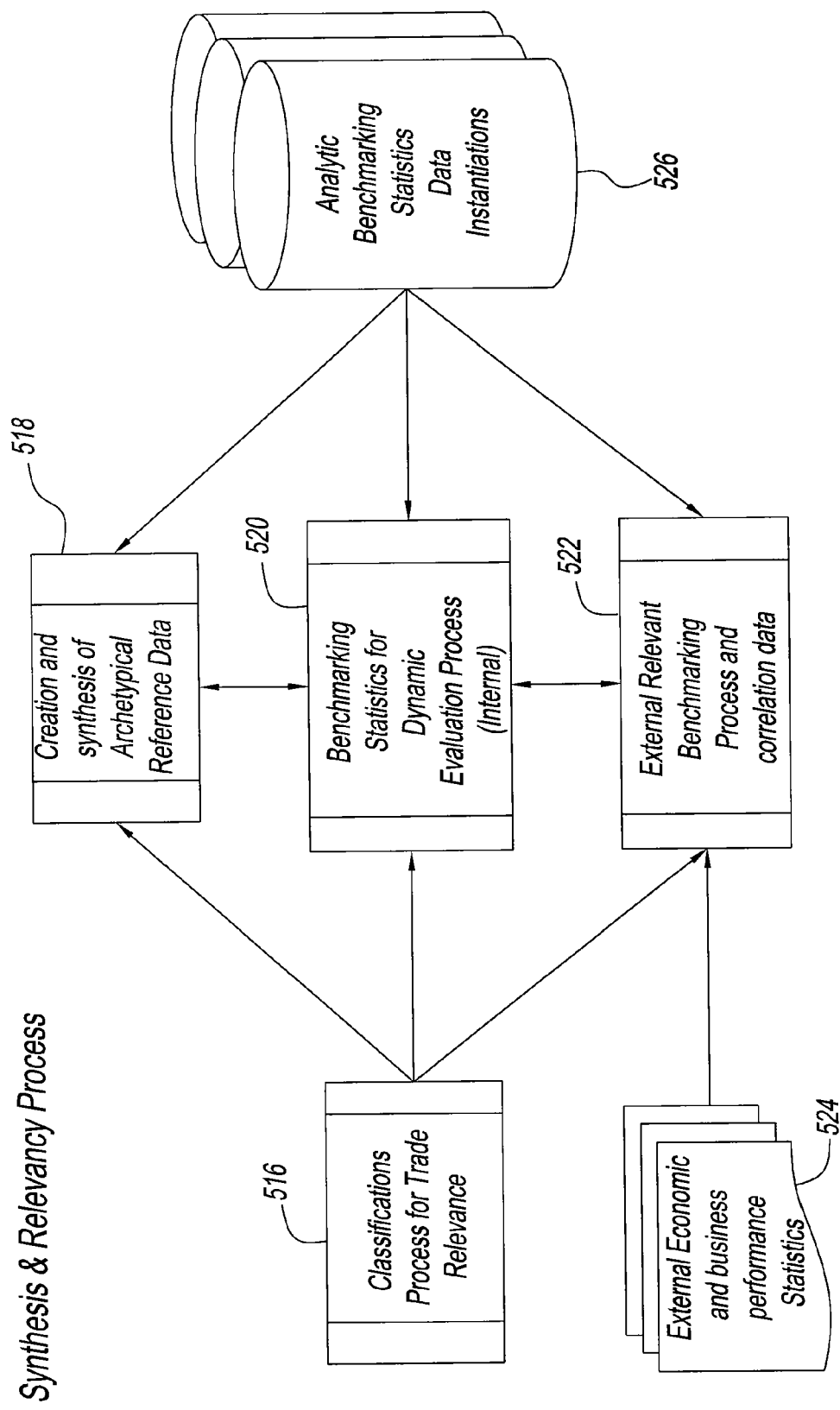
FIG. 10*b* is a block diagram of the synthesis and relevancy process according to the present disclosure.

As shown in FIG. 10b, the synthesis and relevancy process starts with the classification process for trade relevancy 516. Thereafter, the steps are optionally performed, i.e., creation and synthesis of archetypical reference data 518, benchmarking statistics for dynamic evaluation process (internal) 520, and/or external relevant benchmarking process and correlation data 522. In addition, external economic and business performance statistics 524 are provided to the step 522. The data that has been processed is then processed by analytic benchmarking statistics data instantiations 526.

Figure 11:
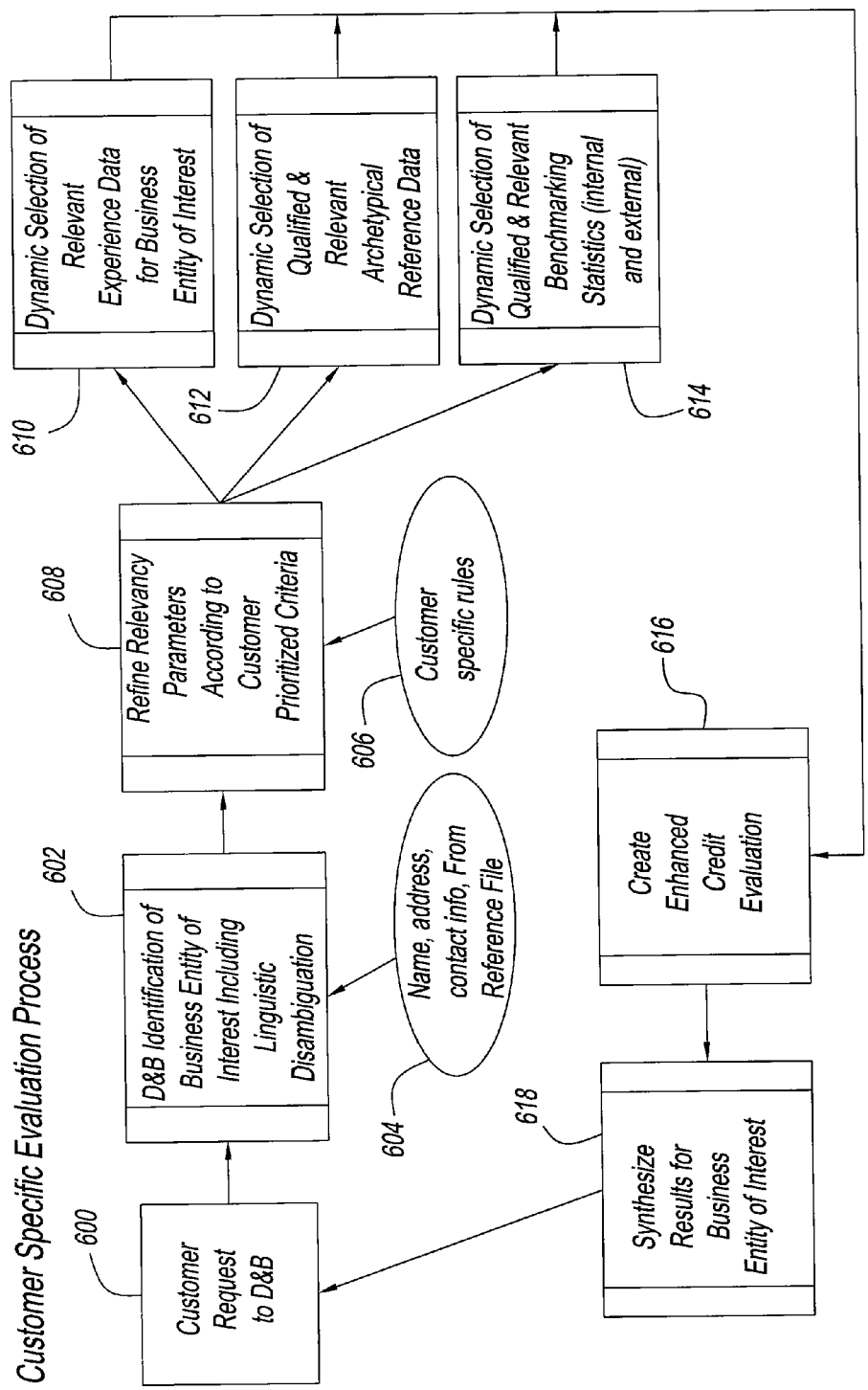
FIG. 11 is a flow diagram of the customer specific evaluation process according to the present disclosure.

FIG. 11 demonstrates the customer specific evaluation process 504, where customers or users will be enabled to leverage these enhancements by being able to define their relevant peer groups for analysis, their custom criteria for risk assessment or to leverage profiles that are established based on monitoring changes in reported trade experience. The user signs on to the detail trade analysis system 600 of the present disclosure and thereafter requests the system to leverage match technologies (see U.S. Pat. No. 7,392,240, which is incorporated herein in its entirety by reference thereto) to identify the business entity of interest 602, including, but not limited to, linguistic disambiguation by searching reference files 604. For users who have established their custom criteria via customer specific rules 606, the system will incorporate their request in the selection of relevant trade experiences 608. As an example, some users with high dollar risk exposure would prefer to exclude any reported trade experiences from the utility or telecommunications industries. In this new process, the system would select only the trade experiences that are relevant for this particular user's request and would exclude trades from utilities and telecommunications via a dynamic selection of relevant experience data for the business entity of interest 610. To develop additional insights for the credit evaluation, the system will also apply these criteria on selection of records for comparison by a dynamic selection of qualified and relevant archetypical reference data 612 or to develop peer groups for analytics via a dynamic selection of qualified and relevant benchmarking statistics (internal and external) 614. The enhanced credit evaluation is provided by dynamically assessing the performance across these segmented data sets to provide a synthesized analysis in the user's requested format (i.e., scores, attributes, reports, etc.) (616, 618).

The techniques described herein are exemplary, and should not be construed as implying any particular limitation on the present invention. It should be understood that various alternatives, combinations and modifications could be devised by those skilled in the art. The present invention is intended to embrace all such alternatives, modifications and variances that fall within the scope of the appended claims.

What is claimed is:

1. A computer-implemented method for causing a computer associated with a database to provide an enhanced credit evaluation report, said method comprising:

collecting from a source, data about an entity of interest, for storage in said database;

linking said entity of interest to a related entity in a corporate family tree stored in said database;

receiving a request for said enhanced credit evaluation report about said entity of interest;

obtaining user-specified rules or criteria for evaluating credit of said entity of interest;

dynamically selecting from a database of trade experiences stored in said database, based upon said user-specified rules or criteria, (a) trade experiences for said entity of interest and for said related entity, and (b) trade experiences for a peer group;

dynamically assessing performance across said trade experiences for said entity of interest; and generating, using said computer, said enhanced credit evaluation report of said entity of interest based upon a comparative analysis of said trade experiences for said entity of interest and for said related entity and said trade experiences for said peer group.

2. The method according to claim 1, further comprising classifying trade experiences in said database.

3. The method according to claim 2, wherein said trade experiences in said database are classified by applying a meta-data tag to each of said trade experiences in said database.

4. The method according to claim 1, further comprising at least one event-driven enhancement selected from the group consisting of: creating segmentation benchmark statistics, identifying trade experience behaviors consistent with fraudulent companies, and detecting changes in trade experience that is indicative of said entity of interest's business either improving or deteriorating.

5. The method according to claim 2, wherein said classification step comprises creating an archetypical reference data of said trade experiences in said database, performing benchmarking of said trade experiences in said database, and/or performing external relevant benchmarking and data correlation of said trade experiences in said database.

6. The method according to claim 4, wherein said event-driven enhancement step comprises: performing benchmarking of trade experiences in said database, and/or performing external relevant benchmarking and data correlation of said trade experiences in said database.

7. A computer system comprising:
a processor;
a database; and
a memory that contains instructions that are executable by said processor to
control said processor to perform actions of:
collecting from a source, data about an entity of interest;
linking said entity of interest to a related entity in a corporate family tree;
receiving a request for an enhanced credit evaluation report about said entity of interest;
obtaining user-specified rules or criteria for evaluating credit of said entity of interest;
dynamically selecting from a database of trade experiences, based upon said user-specified rules or criteria, (a) trade experiences for said entity of interest and for said related entity, and (b) trade experiences for a peer group;
dynamically assessing performance across said trade experiences for said entity of interest; and
generating said enhanced credit evaluation report of said entity of interest based upon a comparative analysis of said trade experiences for said entity of interest and for said related entity and said trade experiences for said peer group.

8. The system according to claim 7, further comprising classifying trade experiences in said database.

9. The system according to claim 8, wherein said trade experiences in said database are classified by applying a meta-data tag to each of said trade experiences in said database.

10. The system according to claim 7, further comprising at least one event-driven enhancement selected from the group consisting of: creating segmentation benchmark statistics, identifying trade experience behaviors consistent with fraudulent companies, and detecting changes in trade experience that is indicative of said entity of interest's business either improving or deteriorating.

11. The system according to claim 8, wherein said classification step comprises creating an archetypical reference data of said trade experiences in said database, performing benchmarking of said trade experiences in said database, and/or performing external relevant benchmarking and data correlation of said trade experiences in said database.

12. The system according to claim 10, wherein said event-driven enhancement step comprises: performing benchmarking of trade experiences in said database, and/or performing external relevant benchmarking and data correlation of said trade experiences in said database.

13. A non-transitory storage medium comprising instructions tangibly embodied thereon, wherein said instructions are readable by a processor to cause said processor to perform actions of:
collecting from a source, data about an entity of interest;
linking said entity of interest to a related entity in a corporate family tree;
receiving a request for an enhanced credit evaluation report about said entity of interest;
obtaining user-specified rules or criteria for evaluating credit of said entity of interest;
dynamically selecting from a database of trade experiences, based upon said user-specified rules or criteria, (a) trade experiences for said entity of interest and for said related entity, and (b) trade experiences for a peer group;
dynamically assessing performance across said trade experiences for said entity of interest; and
generating said enhanced credit evaluation report of said entity of interest based upon a comparative analysis of said trade experiences for said entity of interest and for said related entity and said trade experiences for said peer group.

* * * * *